United States Patent
Baker et al.

(10) Patent No.: US 9,158,181 B2
(45) Date of Patent: *Oct. 13, 2015

(54) LIGHT FOCUSING DEVICE

(71) Applicant: ExpoImaging, Inc., Watsonville, CA (US)

(72) Inventors: John B. Baker, Watsonville, CA (US); Erik Sowder, Watsonville, CA (US)

(73) Assignee: ExpoImaging, Inc., Watsonville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,954

(22) Filed: Jan. 7, 2013

(65) Prior Publication Data

US 2014/0079382 A1    Mar. 20, 2014

Related U.S. Application Data

(63) Continuation-in-part of application No. 13/619,282, filed on Sep. 14, 2012.

(51) Int. Cl.
  *G03B 11/00*    (2006.01)
  *G03B 15/03*    (2006.01)
  *G03B 17/12*    (2006.01)
  *G03B 17/56*    (2006.01)

(52) U.S. Cl.
  CPC ............. *G03B 15/03* (2013.01); *G03B 17/12* (2013.01); *G03B 17/566* (2013.01); *G03B 2215/0514* (2013.01); *G03B 2215/0592* (2013.01)

(58) Field of Classification Search
  USPC ............. 396/25–29, 155, 162, 174–178, 396/198–199, 544; 348/370, 371, 373–376; 362/16–18
  See application file for complete search history.

(56) References Cited

U.S. PATENT DOCUMENTS

| | | | |
|---|---|---|---|
| 4,017,727 A * | 4/1977 | Yamamoto | 362/16 |
| 5,337,104 A * | 8/1994 | Smith et al. | 396/199 |
| 5,437,104 A | 8/1995 | Chien | |
| 6,029,011 A | 2/2000 | Sato | |
| 7,748,858 B2 | 7/2010 | Fong | |
| 7,983,552 B2 | 7/2011 | Moon et al. | |
| 2005/0259409 A1 | 11/2005 | Pohlert et al. | |

(Continued)

FOREIGN PATENT DOCUMENTS

| | | |
|---|---|---|
| JP | 2007-065081 A | 3/2007 |
| JP | 2007-139871 A | 6/2007 |
| KR | 1020120026687 | 3/2012 |

OTHER PUBLICATIONS

International Searching Authority, International Search Report and Written Opinion, PCT/US2013/059311, Dec. 16, 2013, 18 pages.

(Continued)

*Primary Examiner* — Minh Phan

(57) ABSTRACT

A light focusing device for detachably coupling to a camera with a built-in flash. The device comprises a mount for detachably coupling to the camera; a housing coupled with the mount, the housing configured to enclose the built-in flash when the built-hi flash is an enabled position and comprising an alignment verification window; and a lens coupled with the housing such that light generated by the built-in flash is focused by the lens such that intensity of the light is increased farther away than what the built-in flash is able to do on its own. One or more spacers are included to adjust the height of the housing with respect to the flash for proper alignment.

34 Claims, 8 Drawing Sheets

(56) References Cited

U.S. PATENT DOCUMENTS

| | | |
|---|---|---|
| 2008/0181598 A1 | 7/2008 | Kobre |
| 2012/0099849 A1 | 4/2012 | Onishi et al. |
| 2013/0010134 A1 | 1/2013 | Motoki et al. |
| 2013/0010185 A1 | 1/2013 | Motoki et al. |
| 2014/0009671 A1 | 1/2014 | Ozone et al. |
| 2014/0064718 A1 | 3/2014 | Imafuji et al. |

OTHER PUBLICATIONS

KR10-2012-0026687, Koh, Yeong-Guk, Date of Published Mar. 20, 2012, Machine Translation.

* cited by examiner

LIGHT FOCUSING DEVICE

RELATED APPLICATIONS

This application is a continuation-in-part of co-pending U.S. patent application Ser. No. 13/619,282, filed on Sep. 14, 2012, entitled "Light Focusing Device," by Baker et al., and assigned to the assignee of the present application.

BACKGROUND

This invention relates to the modification of light from a photographic flash built in to a camera.

BRIEF DESCRIPTION OF THE DRAWINGS

FIGS. 1-2A illustrates embodiments of a light focusing device in accordance with embodiments of the present invention.

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In general, the use of photographic flash can enable photographers to shoot with a faster shutter speed, to freeze motion and to fill in shadows. Certain types of photography, for instance, wildlife photography and sports photography, benefit from the ability to project strobe light (e.g., a photographic flash) at a distance.

Typically, light emitted from a conventional built-in flash is spread out at a wide angle and does not provide sufficient illumination and intensity for objects at a distance from the camera.

Conventional flash modifiers for built-in flash are primarily, diffusers or reflectors. That is, these modifiers attempt to soften or spread out light to make the light more flattering for portraiture by diffusing the light through a translucent material or by reflecting it off walls or ceilings.

Rather than diffuse or reflect light, the light focusing device, described herein, substantially improves the ability of a conventional built-in flash to project light at a distance by using a lens to efficiently focus the light into the reduced field of view presented by a zoom lens.

Figure 1:
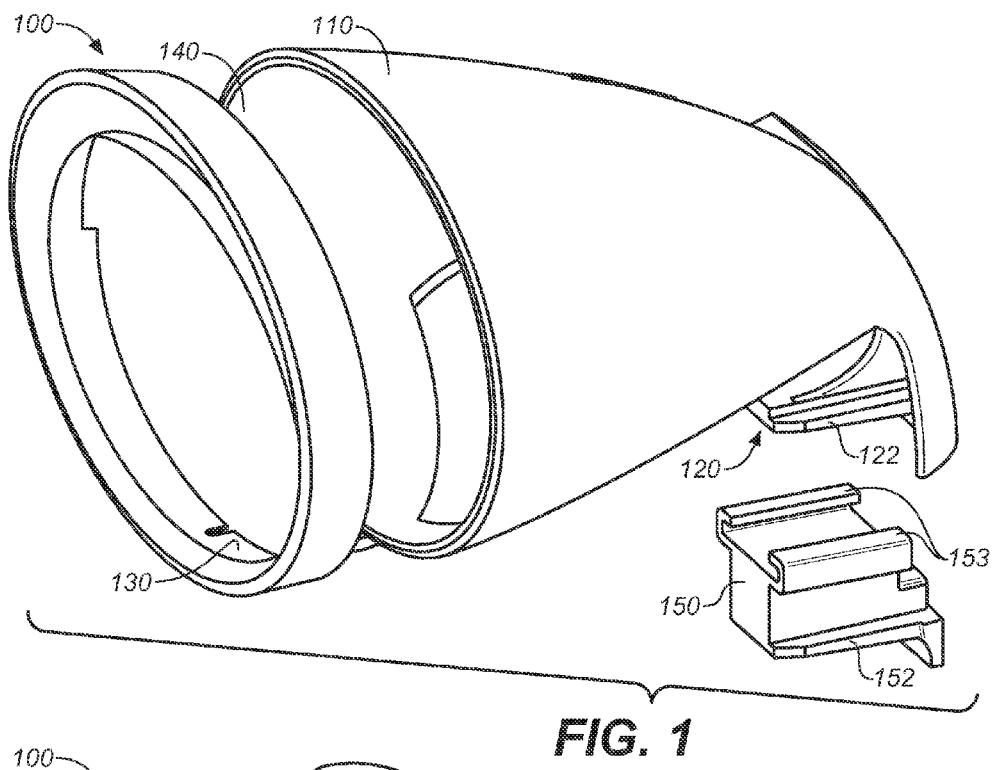

FIG. 1 depicts an exploded isometric view of an embodiment of light focusing device 100. Device 100 includes housing 110, mount 120, bezel 130, lens 140 and optionally, spacer 150. In one embodiment, light focusing device 100 includes an alignment verification window 600. Alignment verification window 600 enables a user to position the light focusing device 100 with respect to a built-in pop-up flash of camera 210. In one embodiment, one or more spacers 150 of different profiles enable proper alignment of the light focusing device with respect to the flash of the camera. Features of alignment verification window 600 are described in more detail below.

In general, light focusing device 100 is for receiving light generated by a flash (e.g., built-in flash) of a camera, and focusing and concentrating the light at a distance which is further than what the flash is able to provide on its own, which will be described in further detail below. In other words, light focusing device 100, combined with a photographic flash, acts somewhat like a spotlight and provides sufficient illumination to illuminate objects a greater distance away from the camera than what the flash is able to provide on its own. Alignment verification window 600 can be used to properly position the light focusing device 100 with respect to the pop-up flash of camera 210.

Figure 2A:
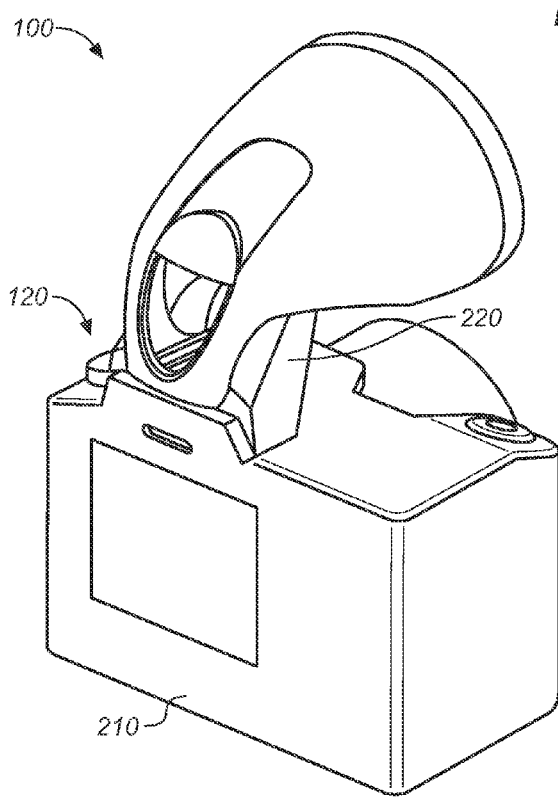
Figure 2B:
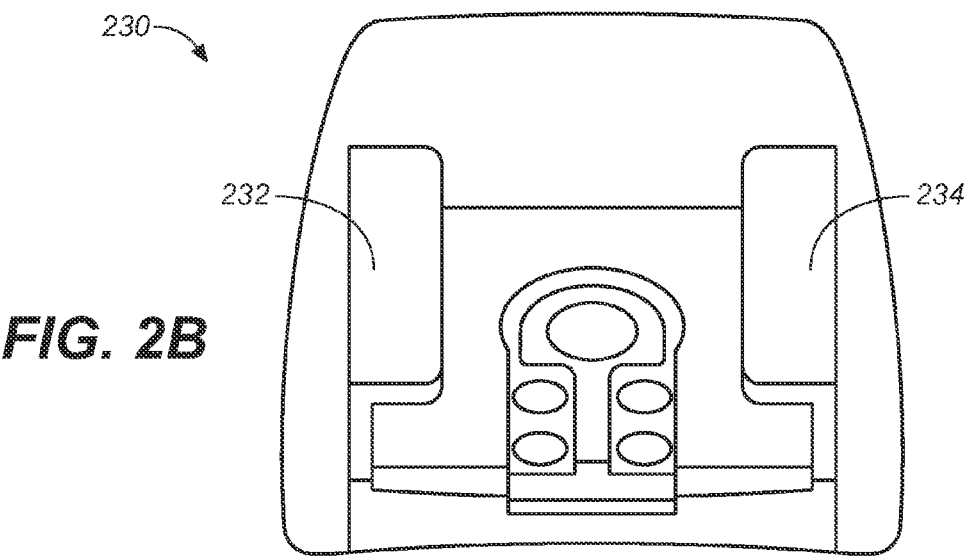
FIG. 2B illustrates an embodiment of a hot shoe in accordance with embodiments of the present invention.

Referring to FIGS. 1-2B, device 100 is detachably mounted to camera 210. Camera 210 can be any camera that includes flash, such as a built-in flash. For example, camera 210 can be, but is not limited to, a digital single-lens reflex (DSLR) camera or a mirrorless camera.

Camera 210 includes hot shoe, such as hot shoe 230, as depicted in FIG. 2B. A hot shoe is a mounting point on top of a camera that allows for accessories to be mounted to the camera. The hot shoe also has electrical contacts that allow for electrical communication between the accessory and the camera. It is noted that device 100 is not electrically connected to the camera when mounted in the hot shoe.

Device 100 is detachably connected to a hot shoe via mount 120. For example, feature 122 of mount 120 slides under features 232 and 234 of hot shoe 230, such that mount 120 is physically mounted or seated in hot shoe 230. It should also be appreciated that device 100 can also be connected to various mounts, such as, but not limited to a cold shoe or an eyepiece mount. A cold shoe is similar to a hot shoe except that a cold shoe does not have electrical contacts.

Housing 110 is configured to enclose built-in flash 220 when built-in flash 220 is an enabled position. Typically, the built-in flash is a pop-up unit on top of the camera (e.g., DSLR camera) and is used to supply illumination when the ambient lighting conditions drop below a certain level or when a photographer desires to use flash for creative effect. This level can be determined by the camera's exposure meter or can be manually selected by a photographer.

Figure 7A:
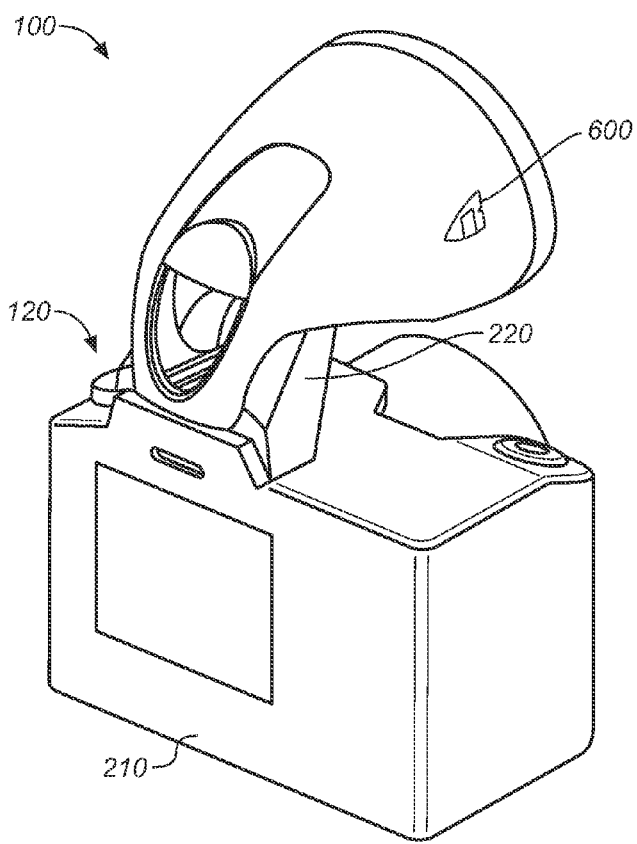
FIG. 7A illustrates an embodiment of the housing comprising an alignment verification window in accordance with embodiments of the present invention.

When in an enabled position, the built-in flash is in an extended position, as shown in FIG. 2A. When not in use, or in a disabled position, the built-in flash is typically in a retracted position. For example, the built-in flash is retracted and seated into the housing of the camera. FIG. 7A shows an embodiment of the light focusing device with an alignment window 600 that can be used to properly align the light focusing device with respect to the flash. In one embodiment, the alignment of the light focusing device 100 with respect to the flash can be altered by using one of a plurality of spacers 150 that mount between the hot shoe 230 and the mount 120.

Typically, when accessories are mounted into the hot shoe, the enablement of the built-in flash is disabled. That is, the built-in flash is disabled from being extended into the enabled position. However, this disabling feature can be overridden. In particular, when mount 120 is seated into the hot shoe the built-in flash is able to be extended into the enabled position and is able to emit light.

Housing 110 positions the lens at an efficient distance from the flash, centers the lens in front of the flash and prevents light from being directed outside the lens. Housing 110 controls the light such that it is projected substantially forward towards lens 140. In contrast, a light emitted from a conventional flash is projected at a wide angle from the flash. In one embodiment, one or more spacers, such as spacer 150 can be selected to center the flash with respect to the lens of light focusing device 100.

In one embodiment, housing 110 is a semi-conical shape with an elliptical end. It should be appreciated that housing 110 can be any shape that is conducive to controlling the light such that it is projected forward (in front of the camera) and directly towards lens 140.

Housing 110 is also adjustable. For example, housing 110 adjusts to allow the lens 140 to be adjusted forward, backwards, up and/or down in relation to the hot shoe mount. In one embodiment, a plurality of spacers 150 of different height can be used to adjust the positioning of the housing 110 with respect to the flash. In one embodiment, the spacers mount between the mount 122 and hot shoe 230 and can be used alone or in a stacking configuration.

Lens 140 is disposed at a distal end of housing 110. In one embodiment, bezel 130 facilitates in seating lens 140 in housing 110. For example, lens 140 is detachably disposed between bezel 130 and the distal end of housing 110.

Lens 140 is configured to control and focus the light from the flash such that the light is optimally projected to improve the quality of light from the camera. For example, by utilizing device 100, the light generated by the flash is captured and concentrated such that the intensity of light is increased farther away from the camera as compared to what the built-in flash is able to do on its own.

Figure 3:
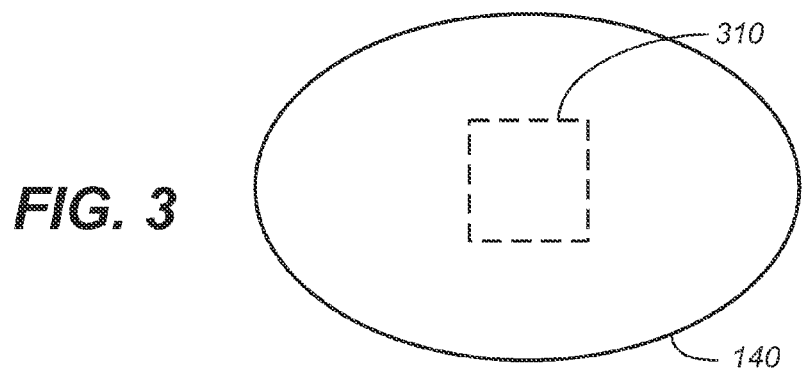
FIG. 3 illustrates an embodiment of a lens and a photographic flash centered behind the lens in accordance with embodiments of the present invention.

The flash or bulb 310 of the built-in flash is centered with lens 140, as depicted in FIG. 3. If the built-in flash, when in the enabled position, is not centered with lens 140, then the intensity of light and the light pattern projected from device 100 will not be optimal; the amount of light may be decreased and the pattern of light may not be uniform. If the built-in flash, when in the enabled position, one or more spacers 150 can be selected and disposed between the device 100 and the hot shoe 230 to properly align the light focusing device 100 with the built-in flash.

In one embodiment, spacer 150 facilitates in centering the flash with lens 140. For example, feature 122 seats with feature 153 of spacer 150, while feature 152 seats with features 232 and 234 of hot shoe 230. In one embodiment, a plurality of spacers is provided with light focusing device 100 to enable proper alignment over a wide range of cameras. A user can see through alignment verification window 600 to check proper alignment and if the alignment is off, a different spacer can be used to properly align the device 100 with respect to the pop-up flash. By having a plurality of spacers, a user can use device 100 on more than one camera even if the cameras have different pop-up flash configurations.

Lens 140 is designed such that it is has an optimum light spread for a field of view of the camera. In particular, the lens of the camera has a focal length which creates a particular field of view. Accordingly, lens 140 is designed such that the light focused by lens 140 fits the particular field of view of the lens of the camera.

In one embodiment, lens 140 is a Fresnel lens. For example, an elliptical Fresnel lens. In general, a Fresnel lens comprises concentric grooves molded into the surface of the lens material. The grooves act as individual refracting surfaces (e.g., prisms) that focus the emitted light.

It should be appreciated that lens 140 may be any lens that focuses light, as described herein, such as but not limited to a meniscus lens.

Figure 6A:
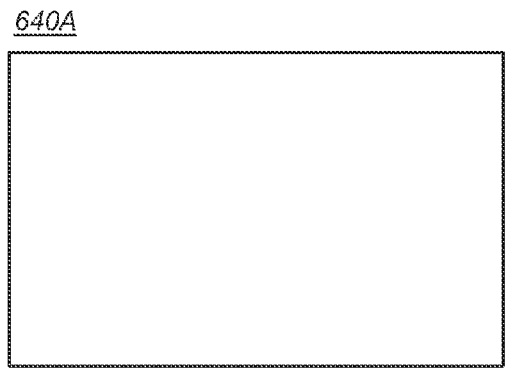
FIG. 6A-B illustrates embodiments of a lens in accordance with embodiments of the present invention.
Figure 6B:
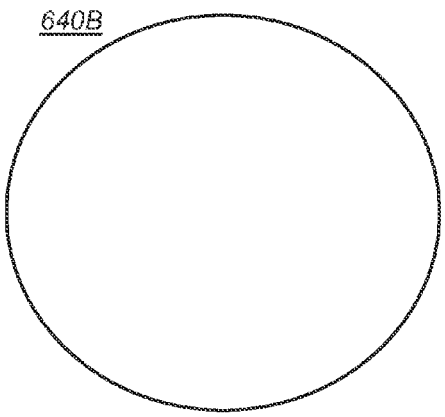

It should be appreciated that lens 140 may be any shape that is conducive to focusing the emitted light, as described herein. For example, the shape of lens 140 may be, but is not limited to a rectangular shape (e.g., lens 640A in FIG. 6A) and a circular shape (e.g., lens 640B in FIG. 6B).

In another embodiment, lens 140 has a thickness of about 1.5 mm with a focal length in the range of 2-3 inches. In a further embodiment, lens 140 is an injection molded polycarbonate. It should be appreciated that lens 140 may be comprised of various materials, such as, but not limited to plastic, glass, acrylic, etc.

Figure 4:
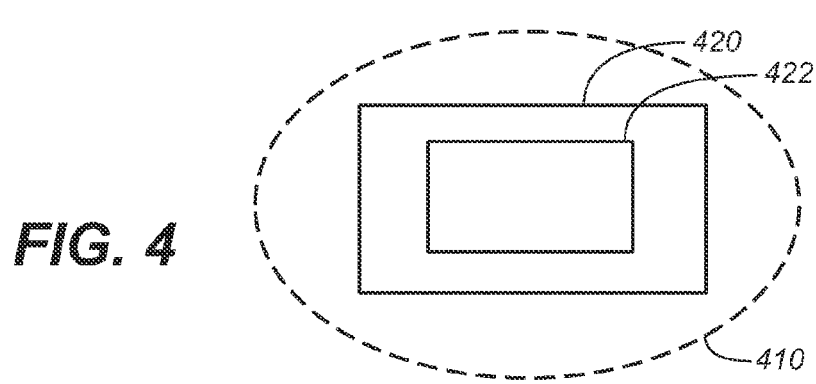
FIG. 4 illustrates an embodiment of a light spread in accordance with embodiments of the present invention.

FIG. 4 depicts an embodiment of the light spread 410 (or a spot of light), of device 100, with respect to various fields of view (e.g., field of view 420 and field of view 422) of the camera.

Device 100 generates light spread 410 that is larger than the field of views 420 and 422 so that there is even illumination across the whole frame at the given focal lengths. In one embodiment, device 100 generates a focused spot of light that sufficiently illuminates objects in the range of 75-100 feet away from the camera. In contrast, the built-in flash, alone, is usually designed to effectively illuminate objects no further than about 25-30 feet from the camera and does not sufficiently illuminate objects beyond that range.

In various embodiments, field of view 420 is a field of view for a lens having a focal length of 50 millimeter (mm) and a 3.2 aspect ratio; and field of view 422 is a field of view for a lens having a focal length of 200 mm and a 3.2 aspect ratio. Focal length describes the field of view that is seen. As such, the larger the focal length the narrower the field of view. In various embodiments, light spread 410 is able to provide proper light intensity and illumination for a lens focal length in the range of 50 mm to 200 mm. Other lens focal lengths could also be optimized using other embodiments.

Figure 5:
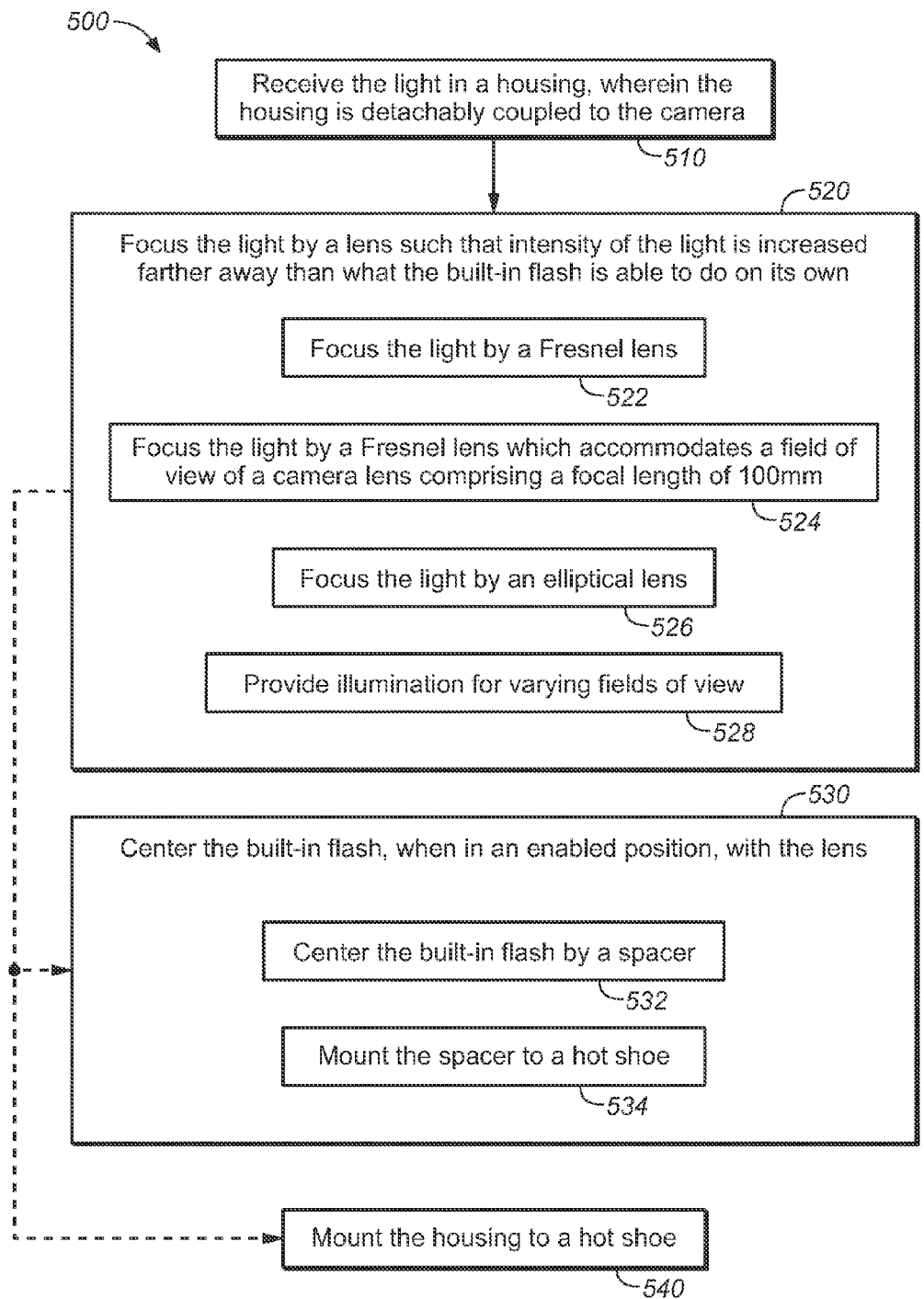
FIG. 5 illustrates an embodiment of a method for focusing light in accordance with embodiments of the present invention.

FIG. 5 depicts an embodiment of method 500 for focusing light generated by a built-in flash of a camera. In some embodiments, method 500 is performed at least by light focusing device 100, as depicted in at least FIG. 1.

At 510 of method 500, light is received in a housing, wherein the housing is detachably coupled to the camera. For example, housing 110 is detachably coupled to camera 210. Also, light emitted by built-in flash 220 is received in the housing.

At 520, light is focused by a lens such that intensity of the light is increased farther away than what the built-in flash is able to do on its own. For example, lens 140 is able to focus the light such that objects are sufficiently illuminated at a distance in the range of 75 feet to 100 feet.

In one embodiment, at 522, light is focused by a Fresnel lens. For example, lens 140 is a Fresnel lens.

In another embodiment, at 524, the light is focused by a Fresnel lens which accommodates a field of view of a camera lens comprising a focal length of 100 mm. For example, with reference to FIG. 4, the Fresnel lens generates light spread 410 (or a spot of light) such that field of view 420 (e.g., a field of view for a lens with a 100 mm focal length) has even illumination across the whole frame.

In a further embodiment, at 526, light is focused by an elliptical lens. For example, lens 140 is an elliptical lens.

In one embodiment, sufficient illumination is provided for varying fields of view. For example, with reference to FIG. 4, lens 140 generates sufficient light spread 410 such that fields of view 420 and 422 have even illumination across the whole frame.

At 530, the built-in flash, when in an enabled position, is centered with the lens. For example, with reference to FIG. 3, the bulb or flash, when it is in the extended and enabled position, is centered with lens 140.

In one embodiment, at 532, the built-in flash is centered by a spacer. For example, spacer 150 raises the device 100 up (away from the hot shoe) such that the built-in flash is centered with the lens.

In another embodiment, at 534, the spacer is mounted to a hot shoe. For example, spacer 150 (which detachably coupled to mount 120) is mounted in hot shoe 230 such that the built-in flash is centered with the lens.

At 540, the housing is mounted to a hot shoe. For example, housing 110 is mounted to hot shoe 230 (via mount 120) such that device 100 is detachably coupled to camera 210.

Alignment Verification Window

Device 100 can typically enhance the output of a bunt in flash by a factor of six whereas add-on flashes typically provide eight times the output of a bunt in flash. With device 100, a user can achieve flash output that closely achieves the output of add-on flashes at a fraction of the cost, since most add-on flashes are several hundreds of dollars. Moreover, the universal nature of device 100 enables a user to use device 100 with several cameras with different flash configurations without the need of costly add-on flashes. Additionally, device 100 is lighter and more durable than most than conventional add-on flash devices.

Typically, most cameras have a 25 mm distance between the bottom of the hot shoe and the center of the flash. Device 100 can be configured such that the flash, at a 25 mm height, is properly positioned within device 100. A 2.5 mm offset can be tolerable in most instances, meaning a flash height of 22.5 mm to 27.5 mm can be used with device 100 in the 25 mm configuration. For cameras with flash heights higher than that range, a spacer of 5 mm can be used. With a 5 mm spacer, device 100 can be used with flash heights of 27.5 mm-32.5 mm.

For cameras with flash heights higher than that range, a spacer of 10 mm can be used. With a 10 mm spacer, device 100 can be used with flash heights of 32.5 mm-37.5 mm. Spacers make device 100 more universal for use with a wide range of cameras and enable use of a single device across a range of products with different flash configurations.

In one embodiment, a plurality of spacers can be stacked, for example, two 5 mm spacers can be stacked to form a 10 mm spacer. Although 5 mm and 10 mm spacers are described, it is appreciated that any number of spacers of any height or varying heights can be used to align device 100 with respect to the pop up flash.

In one embodiment, an alignment window is disposed in device 100 to help a user correctly position device 100. The alignment window is a feature that can be visually aligned with the pop-up flash to achieve proper alignment of device 100. In one embodiment, one or more alignment verification windows can be used for proper alignment.

FIG. 7A is an illustration of light focusing device 100 having an alignment verification window 600 that enables verification that the light focusing device 100 is properly aligned with the flash 220 of camera 210. In one embodiment, the alignment of device 100 with respect to the flash 220 can be altered by using one or more spacers between mount 120 and device 100. In this arrangement, a user can visually check proper alignment of the flash with respect to the alignment verification window 600. Ii the alignment is not proper, a spacer can be used to achieve proper alignment.

Figure 7B:
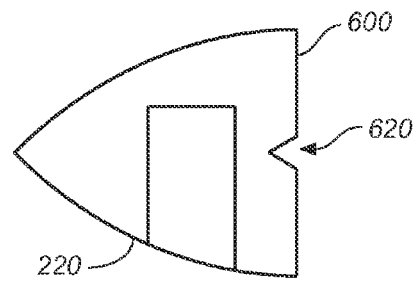
FIG. 7B illustrates an alignment verification window comprising an alignment notch for aligning a light focusing device with a pop-up flash in accordance with embodiments of the present invention.

FIG. 7B shows one embodiment of alignment verification window 600 having an alignment notch 620 that can be used for proper alignment of device 100 with respect to flash 220. In one embodiment, alignment notch should be aligned with the center of flash 200, but in other embodiments, different alignment schemes can be used to enable proper alignment of device 100 with respect to the flash 220. For example, in one embodiment, alignment notch should be aligned with the top of pop-up flash 220.

Figure 8A:
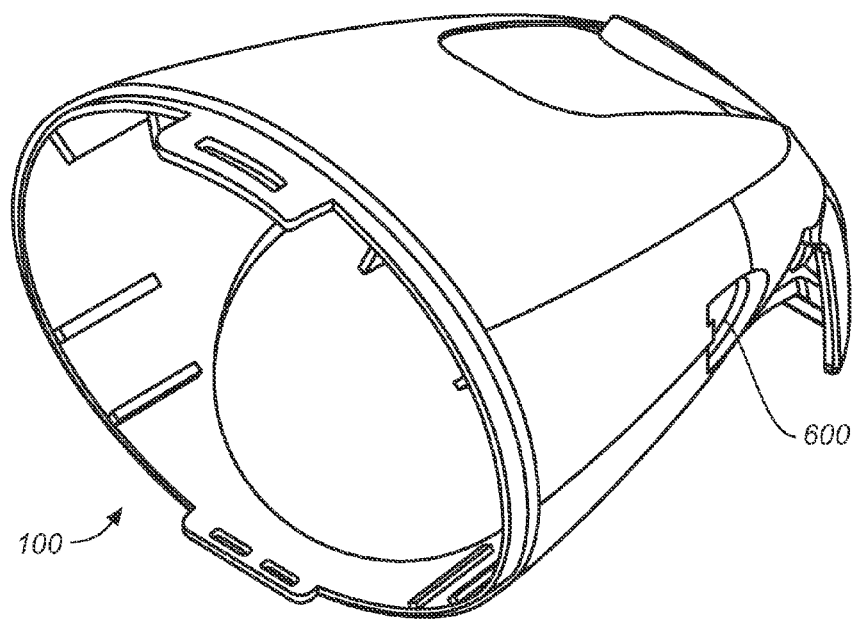
FIGS. 8A-8D show different views of a light focusing device with one or more alignment verification windows in accordance with embodiments of the present invention.

FIGS. 8A-8D illustrate different perspectives of device 100 having one or more alignment verification windows 600. FIG. 8A shows a side profile of device 100 having alignment verification window 600 located on a side portion of device 100. It is appreciated that device 100 can be configured with one or more alignment verification windows to ensure proper alignment of device 100 with respect to a camera flash. The alignment verification window(s) 600 can be disposed in any location on device 100 to enable proper alignment of device 100 with respect to a camera flash.

Figure 8B:
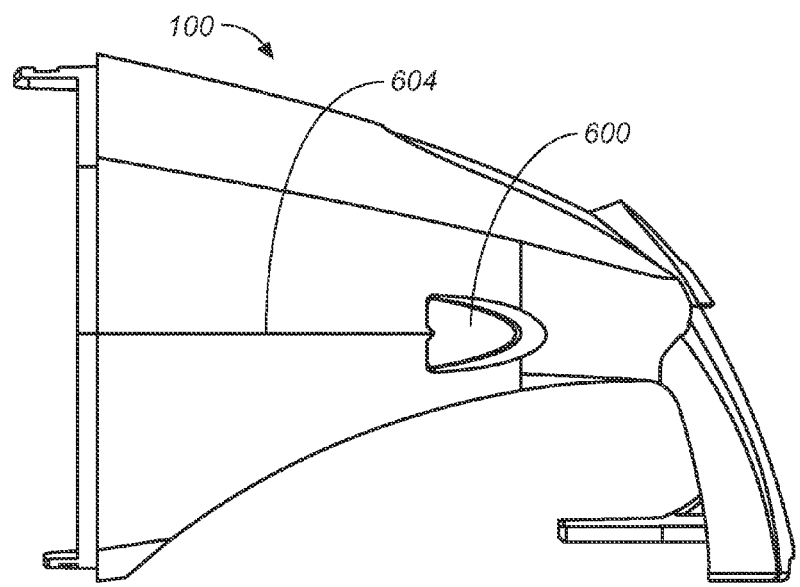

FIG. 8B shows alignment verification window 600 disposed on a centerline 604 of device 100. In this embodiment, the alignment verification window enables the pop-up flash to be centered within device 100.

Figure 8C:
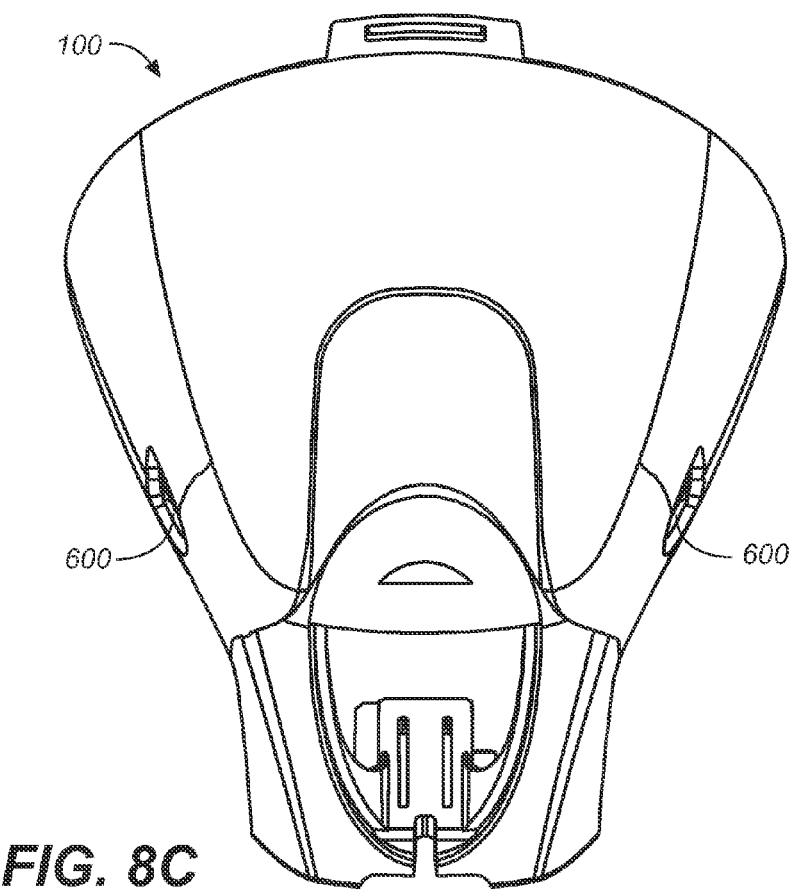

FIG. 8C shows a pair of alignment verification windows 600 disposed on the sides of device 100. In this embodiment, alignment can be checked from either side of device 100 and the windows provide two reference points to enable proper alignment of the flash with the device 100.

Figure 8D:
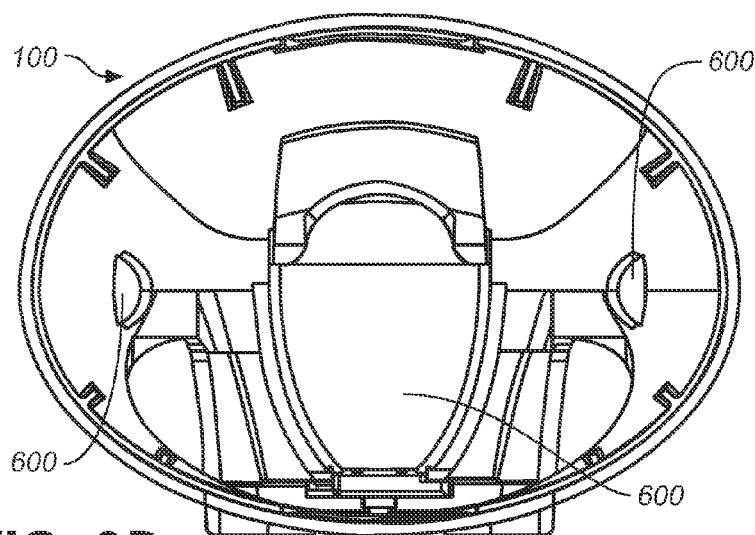

FIG. 8D shows a back side view of device 100 having a plurality of alignment windows 600. In this embodiment, the device 100 has a pair of windows 600 on the sides of device 100 and an optional third window on the back of device 100. Having more than one alignment verification window 600 enable proper alignment of the device 100 with respect to the flash with more accuracy.

Figure 9A:
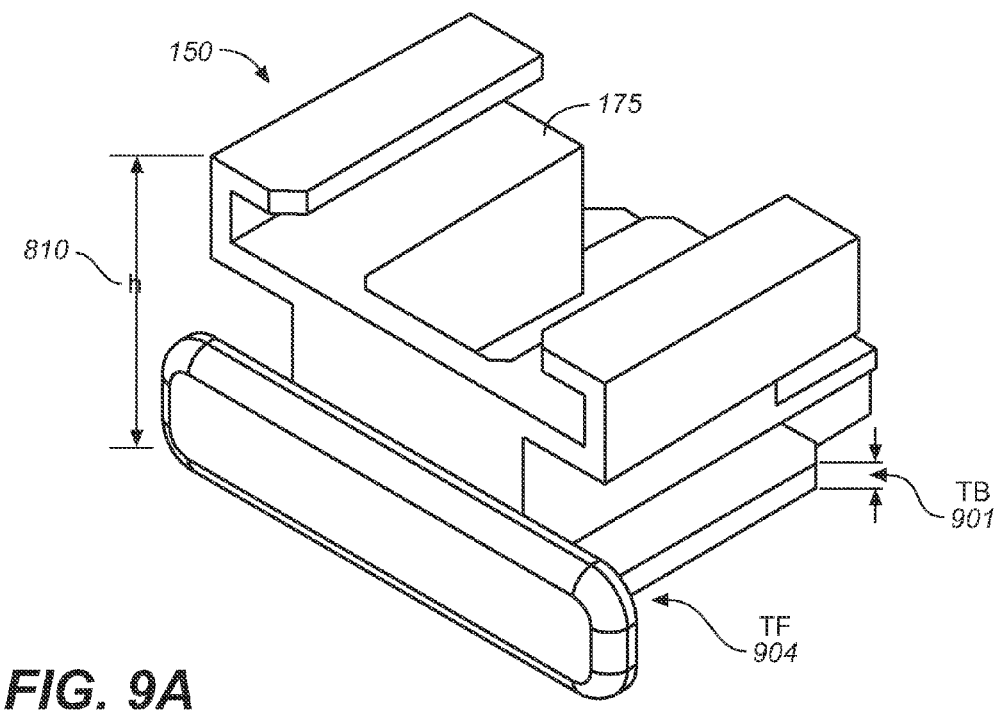
FIGS. 9A-9B illustrate a spacer that can be used with a light focusing device to properly align the light focusing device with a pop-up flash of a camera in accordance with embodiments of the present invention.

FIG. 9A is an illustration of spacer 150 in accordance with embodiments of the present invention. Spacer 150 can be one of a plurality of spacers provided with device 100 that can be used to correctly align device 100 with respect to a flash. In one embodiment, spacer 150 has a profile height 810 that adjusts the vertical alignment of device 100 with respect to a built in flash. In one embodiment, spacer 150 can be stacked with another spacer 150 to provide appropriate height adjustment of device 100 to accommodate pop-up flashes with varying heights.

Attachment feature 175 can be used to couple spacer 150 with another spacer 150 in a stacking arrangement or attachment feature 175 can be used to couple spacer 150 with device 100. In one embodiment, a plurality of spacers 150 with differing profile heights 810 are provided to give a user a wide range of height adjustments that can be used to correctly align device 100. In one embodiment, a thickness of a front portion (TF) 904 of spacer 150 is different from the thickness of the back portion (TB) 901 to facilitate coupling of spacer 150 with device 100 and/or shoe 230.

Figure 9B:
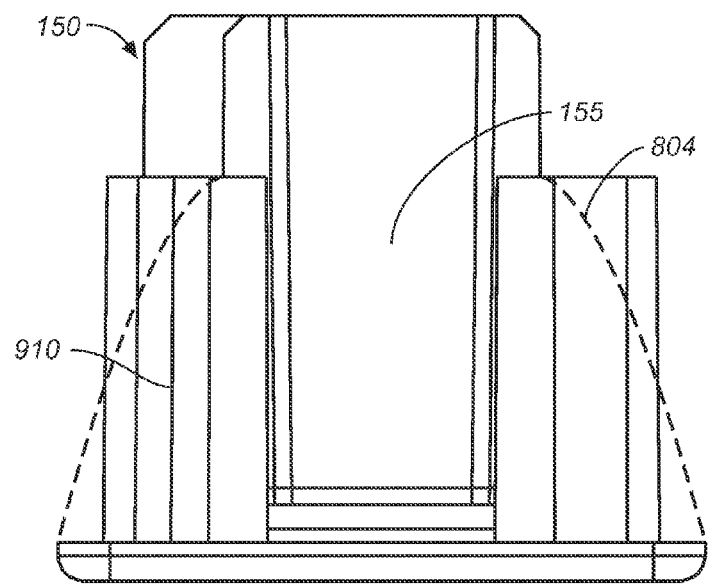

FIG. 9B is a bottom view of spacer 150 showing mount 155 that is configured to couple with shoe 230 of FIG. 2B. Attachment feature 155 can also be used to couple with attachment feature 175 of a second spacer to create a stacked spacer configuration. Spacer 150 can be configured with dimensional draft 804 to facilitate proper coupling with device 100, other spacers 150 and/or shoe 230. Draft 804 shows a slight narrowing of spacer 150 (exaggerated for illustrative purposes) at a receiving end to facilitate proper coupling. Draft 804 is also helpful in the manufacturing phase of spacer 150, as it helps spacer 150 release from a mold. In one embodiment spacer 150 includes a rib portion 910 that can help prevent rocking of the spacer when coupled with shoe 230.

Figure 10:
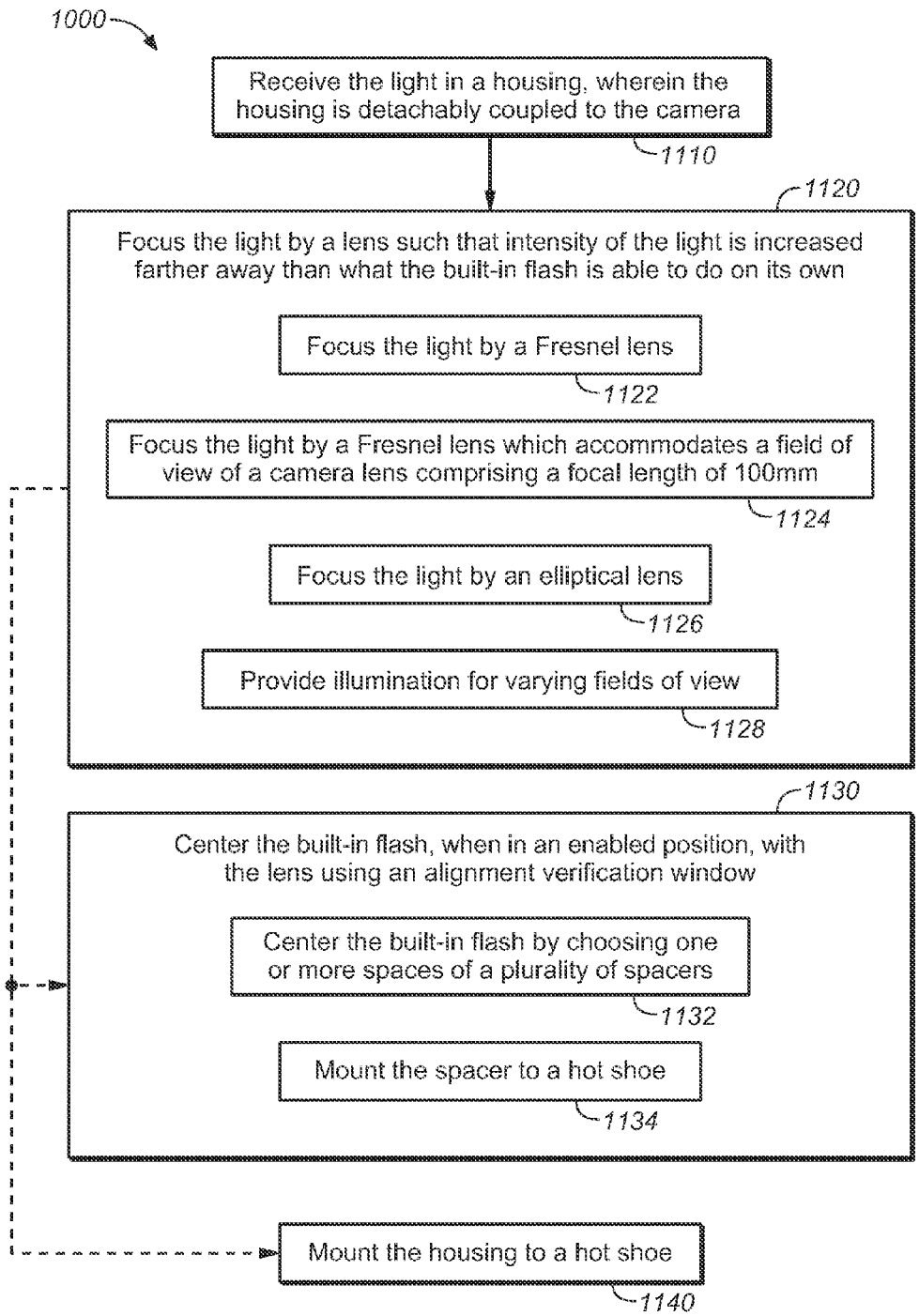
FIG. 10 illustrates an embodiment of a method for focusing light using an alignment verification window in accordance with embodiments of the present invention.

FIG. 10 depicts an embodiment of method 1000 for focusing light generated by a built-in flash of a camera. In some embodiments, method 1000 is performed at least by light focusing device 100, as depicted in at least FIG. 1 with an alignment verification window 600.

At 1010 of method 1000, light is received in a housing, wherein the housing is detachably coupled to the camera. For example, housing 110 is detachably coupled to camera 210. Also, light emitted by built-in flash 220 is received in the housing. In one embodiment, the housing includes an alignment verification window 600 that can be used to align the housing with respect to a camera's built in flash.

At 1020, light is focused by a lens such that intensity of the light is increased farther away than what the built-in flash is able to do on its own. For example, lens 140 is able to focus the light such that objects are sufficiently illuminated at a distance in the range of 75 feet to 100 feet.

In one embodiment, at 1022, light is focused by a Fresnel lens. For example, lens 140 is a Fresnel lens.

In another embodiment, at 1024, the light is focused by a Fresnel lens which accommodates a field of view of a camera lens comprising a focal length of 100 mm. For example, with reference to FIG. 4, the Fresnel lens generates light spread 410 (or a spot of light) such that field of view 420 (e.g., a field of view for a lens with a 100 mm focal length) has even illumination across the whole frame.

In a further embodiment, at 1026, light is focused by an elliptical lens. For example, lens 140 is an elliptical lens.

In one embodiment, sufficient illumination is provided for varying fields of view. For example, with reference to FIG. 4, lens 140 generates sufficient light spread 410 such that fields of view 420 and 422 have even illumination across the whole frame.

At 1030, the built-in flash, when in an enabled position, is centered with the lens. For example, with reference to FIG. 3, the bulb or flash, when it is in the extended and enabled position, is centered with lens 140. In one embodiment, an alignment verification window 600 is used to check positioning of the flash with respect to device 100.

In one embodiment, at 1032, the built-in flash is centered by one or more spacers. For example, spacer 150 raises the device 100 up (away from the hot shoe) such that the built-in flash is centered with the lens. In one embodiment, a plurality of spacers is provided with device 100 and a user can select from the plurality of spacers to properly align the device 100 with the flash of many different cameras.

In another embodiment, at 1034, the spacer is mounted to a hot shoe. For example, spacer 150 (which detachably coupled to mount 120) is mounted in hot shoe 230 such that the built-in flash is centered with the lens. In one embodiment, more than one spacer can be stacked and coupled with device 100 and hot shoe 230 to center the flash with the lens.

At 1040, the housing and/or spacer(s) are mounted to a hot shoe. For example, housing 110 is mounted to hot shoe 230 (via mount 120) such that device 100 is detachably coupled to camera 210.

It should be appreciated that embodiments, as described herein, can be utilized or implemented alone or in combination with one another. While the present invention has been described in particular embodiments, it should be appreciated that the present invention should not be construed as limited by such embodiments, but rather construed according to the following claims.

The invention claimed is:

1. A light focusing device for detachably coupling to a camera with a built-in flash comprising:
    a mount for detachably coupling to said camera, said mount configured to engageably mount into a hot shoe, said mount configured to couple with one or more stackable spacers for positioning a housing with respect to said built-in flash;
    said housing coupled with said mount, said housing comprising an opening configured to receive said built-in flash when said built-in flash is in an enabled position;
    an alignment verification window formed in said housing to enable visual verification of the alignment of the housing with respect to said built-in flash; and
    a lens coupled with said housing such that light generated by said built-in flash is focused by said lens such that intensity of said light is increased farther away than what said built-in flash is able to do on its own.

2. The light focusing device of claim 1, wherein said built-in flash, when in said enabled position, is centered with said lens.

3. The light focusing device of claim 1, wherein said lens is selected from a group consisting of: a Fresnel lens, and a meniscus lens.

4. The light focusing device of claim 1, wherein said lens accommodates a field of view of a camera lens comprising a focal length of 100mm.

5. The light focusing device of claim 1, wherein said lens is selected from a group consisting of: an elliptical lens, a circular lens, a rectangular lens.

6. The light focusing device of claim 1, further comprising:
    said one or more stackable spacers coupled with said mount for aligning said light focusing device with respect to said built-in flash, when in said enabled position.

7. The light focusing device of claim 6, wherein said one or more stackable spacers are configured to mount in said hot shoe.

8. The light focusing device of claim 1, further comprising:
    an adjustable housing allowing the lens to be positionable in relation to said hot shoe.

9. The light focusing device of claim 1, wherein said lens is detachably coupled to said housing.

10. The light focusing device of claim 1, wherein said lens is disposed at a distal end of said housing.

11. The light focusing device of claim 1, wherein said lens is selected from a group consisting of: a polycarbonate lens, an acrylic lens, a glass lens, and a plastic lens.

12. The light focusing device of claim 1 further comprising a plurality of alignment verification windows formed in said housing to enable visual verification of the alignment of the housing with respect to said built-in flash.

13. The light focusing device of claim 1 wherein said alignment verification window comprises an alignment notch for providing a reference point to enable alignment of the housing with respect to said built-in flash.

14. The light focusing device of claim 1, further comprising:
said one or more stackable spacers comprising a plurality of stackable spacers for coupling with said mount and for said positioning of said housing with respect to said built-in flash, when in said enabled position.

15. The light focusing device of claim 14 wherein each of the plurality of stackable spacers are of different profile height.

16. The light focusing device of claim 14 wherein each of the plurality of stackable spacers are of a same profile height.

17. The light focusing device of claim 14 wherein each of the plurality of stackable spacers are configured to be coupled together in a stacked configuration.

18. A method for focusing light generated by a built-in flash of a camera, said method comprising:
mounting a housing to a hot shoe, said housing comprising an opening configured to receive said built-in flash when said built-in flash is in an enabled position, said housing also configured to couple with one or more stackable spacers for positioning said housing with respect to said built-in flash, when said flash in an enabled position and said housing is mounted in said hot shoe;
aligning said housing detachably coupled with said camera;
receiving said light in said housing; and
focusing said light by a lens such that intensity of said light is increased farther away than what said built-in flash is able to do on its own.

19. The method of claim 18, further comprising:
aligning an alignment verification window of said housing with said built-in flash, when in said enabled position.

20. The method of claim 18, further comprising:
adjusting alignment of said housing with respect to said built-in flash using said one or more stackable spacers.

21. The method of claim 20, further comprising:
mounting said one or more stackable spacers to said hot shoe.

22. The method of claim 18, wherein said focusing said light by a lens, further comprises:
focusing said light by a Fresnel lens.

23. The method of claim 22, wherein said focusing said light by a Fresnel lens, further comprises:
focusing said light by a Fresnel lens which accommodates a field of view of a camera lens comprising a focal length of 100mm.

24. The method of claim 18, wherein said focusing said light by a lens, further comprises:
focusing said light by an elliptical lens.

25. The method of claim 18, wherein said focusing said light by a lens, further comprises:
providing illumination for varying fields of view.

26. The method of claim 18, further comprising:
adjusting alignment of said housing with respect to said built-in flash using a plurality of stackable spacers.

27. The method of claim 19 further comprising:
selecting said one or more stackable spacers from a plurality of stackable spacers to perform said aligning.

28. A light focusing device for detachably coupling to a camera with a built-in flash comprising:
a mount for detachably coupling to said camera, said mount configured to engageably mount into a hot shoe and configured to couple with one or more stackable spacers for positioning a housing with respect to said built-in flash for adjusting said alignment of said housing with respect to said camera;
a housing coupled with said mount, said housing comprising an opening configured to receive said built-in flash when said built-in flash is in an enabled position;
an alignment verification window formed in said housing to enable visual verification of the alignment of the housing with respect to said built-in flash; and
a lens coupled with said housing such that light generated by said built-in flash is focused by said lens such that intensity of said light is increased farther away than what said built-in flash is able to do on its own.

29. The light focusing device of claim 28:
wherein said one or more stackable spacers is selected from a plurality of stackable spacers for adjusting an alignment of said housing with respect to said camera.

30. The light focusing device of claim 29 wherein one of said plurality of stackable spacers has a profile height of 5mm.

31. The light focusing device of claim 29 wherein one of said plurality of stackable spacers has a profile height of 10mm.

32. The light focusing device of claim 29 wherein one of said plurality of stackable spacers are configured to be stacked.

33. A light focusing device for emulating a light emitting device by focusing light generated by a built-in flash of a camera comprising:
a mount for detachably coupling to said camera, said mount configured to engageably mount into a hot shoe, said mount configured to couple with one or more stackable spacers for positioning a housing with respect to said built-in flash;
said housing coupled with said mount, said housing comprising an opening configured to receive said built-in flash when said built-in flash is in an enabled position;
an alignment verification window formed in said housing to enable visual verification of the alignment of the housing with respect to said built-in flash; and
a lens coupled with said housing such that light generated by said built-in flash is focused by said lens such that intensity of said light is increased farther away than what said built-in flash is able to do on its own.

34. A method for emulating a light emitting device by focusing light generated by a built-in flash of a camera, said method comprising:
mounting a housing to a hot shoe, said housing comprising an opening configured to receive said built-in flash when said built-in flash is in an enabled position, said housing also configured to couple with one or more stackable spacers for positioning said housing with respect to said built-in flash, when said flash in an enabled position and said housing is mounted in said hot shoe;
aligning said housing detachably coupled with said camera;
receiving said light in said housing; and
emulating said light emitting device by focusing said light by a lens such that intensity of said light is increased farther away than what said built-in flash is able to do on its own.

* * * * *

UNITED STATES PATENT AND TRADEMARK OFFICE
CERTIFICATE OF CORRECTION

PATENT NO. : 9,158,181 B2  Page 1 of 1
APPLICATION NO. : 13/735954
DATED : October 13, 2015
INVENTOR(S) : Baker et al.

It is certified that error appears in the above-identified patent and that said Letters Patent is hereby corrected as shown below:

On the title page item (57)

Abstract, Line 5, Delete: "when the built-hi flash"

Insert: --when the built-in flash--

Signed and Sealed this
Eighth Day of March, 2016

Michelle K. Lee
*Director of the United States Patent and Trademark Office*